(12) United States Patent
Grier

(10) Patent No.: US 7,978,978 B2
(45) Date of Patent: Jul. 12, 2011

(54) TOPOLOGICALLY MULTIPLEXED OPTICAL DATA COMMUNICATION

(75) Inventor: David G. Grier, New York, NY (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 12/759,481

(22) Filed: Apr. 13, 2010

(65) Prior Publication Data

US 2010/0196004 A1 Aug. 5, 2010

Related U.S. Application Data

(63) Continuation of application No. 12/477,584, filed on Jun. 3, 2009, now Pat. No. 7,742,700, which is a continuation of application No. 11/222,469, filed on Sep. 8, 2005, now Pat. No. 7,546,037.

(60) Provisional application No. 60/608,657, filed on Sep. 10, 2004.

(51) Int. Cl.
*H04B 10/00* (2006.01)
*H04B 10/04* (2006.01)
*H04J 14/02* (2006.01)

(52) U.S. Cl. ............... 398/96; 398/86; 398/87; 398/88; 398/168; 398/169; 398/183; 398/188; 398/201

(58) Field of Classification Search ............ 398/82, 398/86–88, 91, 96, 168–170, 183, 188, 201, 398/207, 212
See application file for complete search history.

(56) References Cited

U.S. PATENT DOCUMENTS

| 7,173,711 | B2 | 2/2007 | Dholakia et al. |
| 2002/0057486 | A1* | 5/2002 | Tanaka ................. 359/292 |
| 2004/0234264 | A1 | 11/2004 | Sasaki et al. |
| 2005/0058352 | A1 | 3/2005 | Deliwala |
| 2005/0100102 | A1* | 5/2005 | Gazdzinski et al. ......... 375/242 |
| 2005/0100351 | A1 | 5/2005 | Yuan et al. |
| 2005/0259914 | A1 | 11/2005 | Padgett |
| 2006/0126183 | A1* | 6/2006 | Hasman .................. 359/573 |

OTHER PUBLICATIONS

Courtial et al., "Observation of the Rotational Frequency Shift for Light with Intrinsic and Orbital Angular Momentum", *Quantum Electronics Conference—IQEC 98, Technical Digest*, May 3-8, 1998, pp. 139-140.
Gibson et al., "Free-Space Information Transfer Using Light Beams Carrying Orbital Angular Momentum", *Optics Express*, Nov. 1, 2004, pp. 5448-5456, vol. 12, No. 22.

* cited by examiner

*Primary Examiner* — Dalzid Singh
(74) *Attorney, Agent, or Firm* — Foley & Lardner LLP

(57) ABSTRACT

Systems and methods for encoding information in the topology of superpositions of helical modes of light, and retrieving information from each of the superposed modes individually or in parallel. These methods can be applied to beams of light that already carry information through other channels, such as amplitude modulation or wavelength dispersive multiplexing, enabling such beams to be multiplexed and subsequently demultiplexed. The systems and methods of the present invention increase the number of data channels carried by a factor of the number of superposed helical modes.

26 Claims, 2 Drawing Sheets

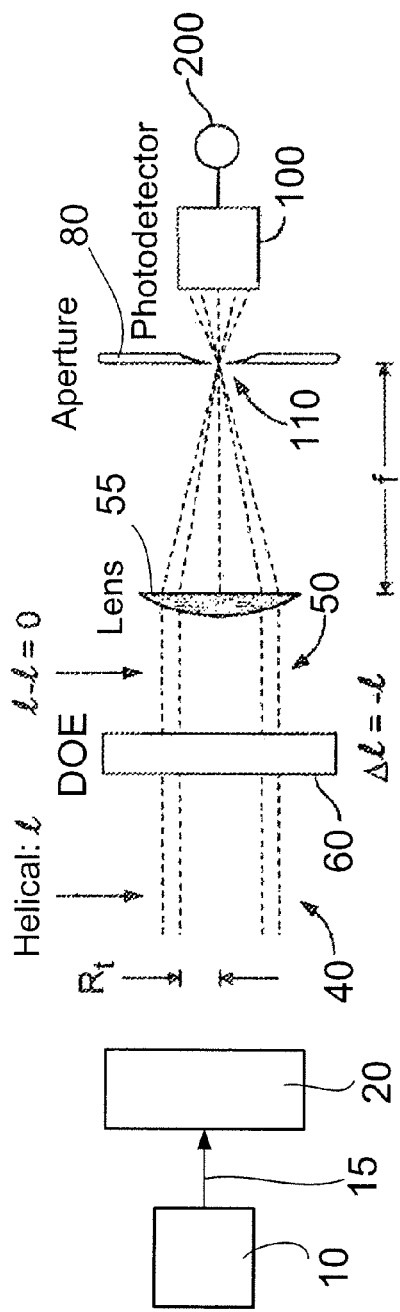
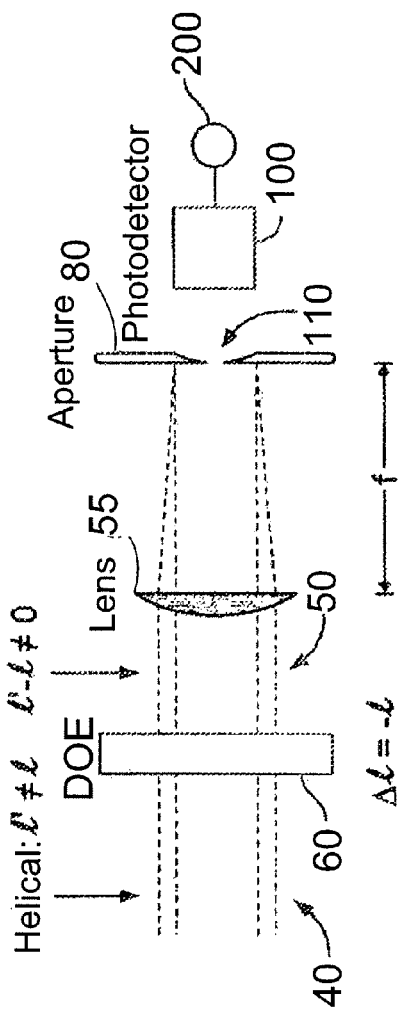
FIG. 2A
FIG. 2B

TOPOLOGICALLY MULTIPLEXED OPTICAL DATA COMMUNICATION

CROSS-REFERENCE TO RELATED PATENT APPLICATIONS

This application is a Continuation of U.S. application Ser. No. 12/477,584, filed Jun. 3, 2009, which is a continuation of Ser. No. 11/222,469, filed Sep. 8, 2005, which claims priority from Provisional Application U.S. Application 60/608,657, filed Sep. 10, 2004, incorporated herein by reference in their entirety.

BACKGROUND OF THE INVENTION

Optical data communication typically involves modulating the amplitude and wavelength of a beam of laser light, and detecting that modulation downstream. The present invention is directed to a complementary approach to conveying information on a beam of light based on the properties of helical optical modes.

A helical mode is characterized by the corkscrew-like topology of its wave fronts, which can be described by a real-valued phase function:

$$\phi(\vec{\rho}) = l\theta, \quad (1)$$

where $\vec{\rho} = (\rho, \theta)$ is the position in a plane transverse to the beam's axis, with $\theta$ being the polar angle, and l is an integral winding number known as the topological charge that describes the pitch of the helix. This phase establishes the beam's topology through the general expression for the magnitude of the electric field in a collimated beam, $$E_l(\vec{\rho}) = v_l(\vec{\rho}) \exp(i\phi(\vec{\rho})) \exp(i\phi_l), \quad (2)$$

where $v_l(\vec{\rho})$ is the real-valued amplitude profile and $\phi_l$ is an arbitrary constant phase. A general superposition of helical modes can be written as $$E(\vec{\rho}) = \sum_{l=-\infty}^{\infty} E_l(\vec{\rho}). \quad (3)$$

If it is assumed that all the beams in the superposition have the same amplitude profile, $v(\vec{\rho})$ perhaps with different amplitudes, $\alpha_l$, then $$E(\vec{\rho}) = \sum_{l=-\infty}^{\infty} \alpha_l v(\vec{\rho}) \exp(i\phi(\vec{\rho})) \exp(i\phi_l), \quad (4)$$

with normalization $$\sum_{l=-\infty}^{\infty} |\alpha_l|^2 = 1.$$

For the practical applications, only a limited set of the $\alpha_l$ will be non-zero.

SUMMARY OF THE INVENTION

The present invention relates in part to methods for transforming conventional beams of light into helical modes and superpositions of helical modes. The present invention also involves detecting helical modes and methods for parallel data extraction from superpositions of helical modes. The ability to encode and decode information carried in a beam's topology leads naturally to methods for topological data communication. A slight elaboration on this theme yields methods for multiplexing and demultiplexing beams of light that also carry information through other channels, such as amplitude modulations.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 2(a) is a representation of a helical beam with topological charge l being converted to a conventional non-helical beam by a DOE encoding a topological charge of −1; and FIG. 2(b) is a representation of a helical beam if the DOE does not exactly cancel the input beam's helicity, wherein the resulting beam still has a dark focus and will not be detected by the photodetector.

DETAILED DESCRIPTION OF THE PREFERRED EMBODIMENTS

Figure 1:
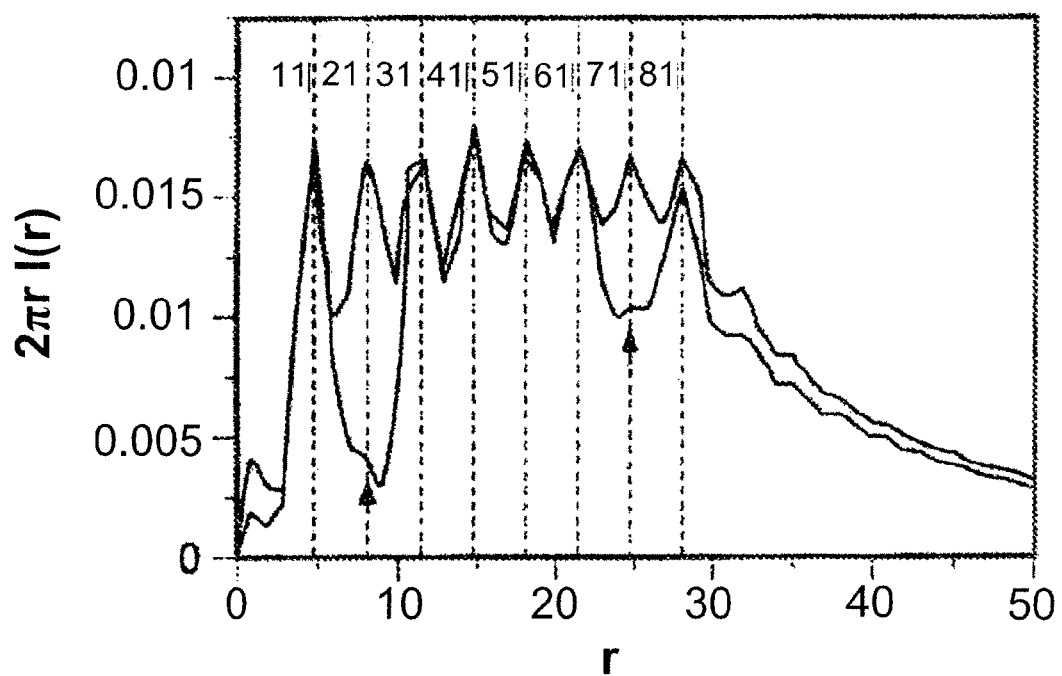
FIG. 1 is a plot showing radial intensity profiles for superpositions of helical modes created from a conventional flat-top beam with a computer-designated phase-only diffractive optical element.

The wave fronts of a helical beam may all meet along the optical axis at a topological singularity known as an l-fold screw dislocation. Conventional beams, by contrast, have no such defect. Introducing such a defect therefore transforms a conventional beam into a helical beam. There are numerous ways to accomplish this transformation and one of the most straightforward methods of transforming a conventional beam into a helical beam is to sculpt the phase of the conventional beam's wave fronts according to Equation (1) discussed previously. This can be accomplished by passing the beam of light through a piece of transparent material with a helical surface relief, with the resulting local phase shift being proportional to the local thickness of the material.

Another method for accomplishing this task is to employ a phase-only spatial light modulator (SLM), which is designed to shift the phase of incident light by a programmable amount at each pixel in a two-dimensional array. SLMs typically are designed to provide a range of $2\pi$ radians of phase shift. Because a phase shift of $2\pi$ is equivalent to a zero phase shift, the helical profile, which covers an arbitrarily large range, can be mapped onto the device's dynamic range with the modulo operator: $\phi(\vec{\rho}) \bmod 2\pi$. Light operated on by an SLM picks up the phase factor, $\exp(i\phi(\vec{\rho}))$ that distinguishes the helical beam in Equation (2) from a conventional beam.

The phase pattern that implements this mode conversion is an example of a phase-only hologram. Whereas an SLM allows for dynamically reconfigured holograms, some data communications applications also can take advantage of various optical elements such as microfabricated diffractive optical elements (DOEs) with fixed phase transfer properties (see FIGS. 2A and 2B).

The helical phase function, represented in Equation (1), creates a helical beam 40 (see FIG. 2A) coaxial with an incident conventional beam 15 (see FIG. 2A). This mode conversion may not occur with perfect efficiency. The result may therefore include an undiffracted portion of the original non-helical beam 15. To avoid this result, it may be desirable to deflect the diffracted helical beam 40. This can be accomplished by adding a phase function encoding a deflection by a wave vector $\vec{k}$, $$\phi \vec{k}(\vec{\rho}) = \vec{k} \cdot \vec{\rho} \qquad (5)$$

to the phase function encoding the mode conversion. The result is a deflected helical beam, with the undiffracted portion propagating in the undeflected direction.

FIG. 1 is a plot showing intensity profiles for superpositions of helical modes created from a conventional flattop beam 15 with a computer-designed phase-only DOE 20 (see FIGS. 2A and 2B. The bold curve is computed for a superposition of eight helical modes with topological charges l=11, 21, 31, 41, 51, 61, 71, and 81. The thin curve is for a superposition with the components at l=21 and 71 excluded. Rescaling the azimuthal averages by the radial coordinate, r, makes clear that the superposed modes have equal power.

Superpositions of helical modes are created generally as follows. In a general superposition, $$E(\vec{\rho}) = \sum_{l=-\infty}^{\infty} \alpha_l \upsilon(\vec{\rho}) \exp(i[l\theta + \vec{k}_l \cdot \vec{\rho} + \phi_l]) \qquad (6)$$

Created from a collimated beam with amplitude cross-section $\upsilon(\vec{\rho})$. Even though the individual modes differ from the input 15 beam by a pure phase factor, the sum also features amplitude modulations. These amplitude modulations can be minimized, but might not be altogether eliminated, by appropriately selecting the relative phases, $\phi_l$. Iterative and direct search algorithms are also available for computing phase-only holograms that can maximize diffraction into such superposed modes.

The data plotted with a bold curve in FIG. 1 were computed for a superposition of eight modes ranging from l=11 to 81, created from a single flat-top beam of light 15 with a phase-only hologram. This plot shows the beam's intensity averaged over angles, scaled by the circumference. Removing two modes from the superposition results in a clearly measurable change in the intensities associated with those modes, and a far less substantial change in other neighboring modes' intensities.

Using these methods, a single conventional laser beam 15 or from other light sources 10 can be transformed into a superposition of helical modes, each traveling in an independently specified direction. Possible example configurations include multiple modes propagating in the same direction, or the beams 40 with the same topological charge traveling in different directions.

A helical mode's topology endows it with an important property for data communications. Because all angles are present along the beam's axis, all phases are present. Typically, the resulting destructive interference causes the beam 40 to be dark along its axis, regardless of the amplitude profile $\upsilon(\vec{\rho})$. The beam's intensity is redistributed into a ring of light of radius $R_l$. The radius of the dark core increases with the beam's topological charge l. In the special case that the amplitude profile is that of a Laguerre-Gaussian eigenmode of the Helmholtz equation, $R_l$, is proportional to $\sqrt{l}$. This is a conventional concept in the art (see, for example, M. J. Padgett and L. Allen. "The Poynting vector in Laguerre-Gaussian modes." Optics Communications 121, 36-40 (1995)). More generally, for Gaussian beams, flat-top beams, and other common profiles, it is conventional that $R_l$ is proportional to l, (see, for example, J. E. Curtis and D. G. Grier. "Structure of optical vortices." *Physical Review Letters* 90, 133901(2003)).

A photodetector 200 whose active area has dimensions substantially smaller than $R_l$ for a given value of will register no light when directly illuminated by a helical beam 40. After operation by the detecting hologram it is then a conventional beam and the beam would now activate the photodetector. FIG. 2(*a*) is a representation showing how the helical beam 40 with topological charge l is converted to a conventional non-helical beam 50 by a DOE 60 encoding a topological charge of −l. The resulting l=0 mode can be focused onto the photo-detector 200 and measured. FIG. 2(*b*) shows how, if the DOE 60 does not exactly cancel the input beam's helicity, the resulting beam 50 still has a dark focus and will not be detected by the photodetector 200.

Recalling that diffractive optical elements are capable of changing a beam's topological charge suggests the method for specifically detecting light in a particular topological mode depicted in FIGS. 2(*a*) and (*b*). The beam of light 15 is operated on by a diffractive optical element 20 encoding a helical mode with topological charge −l. Any component of the beam 40 carrying topological charge l is thereby converted to the non-helical beam 50. After operation by the detecting hologram it is then a conventional beam and the beam can be focused to a bright spot. Other modes with l'≠l will be transformed to helical anodes with topological charge l'−l≠0 and will remain dark on axis using lens 55. Distinguishing different modes can be facilitated by focusing the DOE-transformed beam 50 onto an aperture 80 that will block stray light from undesired modes, thereby improving the detector's selectivity.

Detecting helical modes does not suffer from limited diffraction efficiency to the same extent that creating them does. In particular, if some part of the selected helical mode is not operated on by the detecting DOE 100, then that part will not be detected. Other modes will not be spuriously detected, however, so that faithful mode detection can proceed with an imperfect DOE.

The same selectivity is obtained if the detection DOE 100 also deflects the beam 50. In this case, the detector is centered on the deflected beam's wave vector $\vec{k}_l$ rather than the original beam's optical axis. The detector's DOE can select and deflect different modes into different directions, each of which can be outfitted with a photodetector. This permits parallel detection of data encoded in superpositions of helical beams. For example, the eight modes projected in FIG. 1 can each be read out separately by such a spatially resolved parallel topological detector. In practice, each of the superposed modes is deflected into all of the possible output directions. Only the selected mode for a particular direction focuses on the associated detector, however.

The simplest form of topological data communication is to modulate the topological charge of a beam of light with a time-varying helical diffractive optical element and reading out the result with detectors such as those described in the previous section. Data can be encoded in the time-dependent sequence of topological charges in the beam, with the simplest modulation involving switching between a state with l=0 and another with l≠0. A more sophisticated approach encodes data in a sequence of several values of l, each of which can be read out with a separate topological charge detector. In a still more sophisticated approach, data can be encoded in multiple simultaneous topological channels using a superposition of helical states such as that in FIG. 1.

The detector used to read out the topological charge also may be time-dependent, opening up the ability to hop among topological data channels. This may be useful in applications akin to frequency hopping in secure radio communications.

Beams of light that already carry data through other channels, such as amplitude modulation, wavelength modulation or phase modulation, also can be transformed into helical beams and superposed with other helical beams. Each data stream then is capable of traveling through a particular topological channel in parallel with others.

In one implementation, a plurality of information carrying beams all illuminate an appropriately designed diffractive optical element, each at a particular angle. The diffractive optical element deflects all of the beams into one or more selected directions, endowing each beam with a specific topological charge. The result is one or more beams carrying a superposition of different helical modes, each carrying information encoded in other characteristics of the beam. This type of beam is referred to as a topologically multiplexed beam.

The multiplexed beam can be demultiplexed with a similar DOE that dissects the superposed beam into the individual constituents, one per topological channel. These reconstituted beams can be further analyzed with other techniques. The simplest implementation of this idea would use two copies of the same DOE, one to multiplex the beams, and another turned backward to demultiplex it.

The system and method of the present invention can be incorporated into a number of different applications. For example, a beam that already carries multiple data channels can be taken to undergo wavelength division multiplexing, where multiple wavelengths of light can be passed over a single fiber, to impress upon it a helical phase profile, thereby making the beam amenable to topological multiplexing. Such a system would allow for a significantly increased number of topological channels, resulting in a multiplication of the bandwidth of a particular communication channel.

Additionally, the present invention could also be used to create an encryption system. This encryption system may further be high high-speed and/or an all-optical encryption system. Furthermore, the superposition of topological states itself can be used to convey information. One could also therefore encode information in the time-dependent superposition of topological modes, in addition to any other information carried within the input beams themselves. This can be used, for example, to maintain an encoded checksum for the data carried on the multiple data channels to authenticate the sender of information. This process can constitute an additional, potentially secure, data channel in its own right. The present invention may provide for security advantages and advances in secure communication which deter or prevent intrusion, eavesdropping, or unauthorized access, reception or decoding of transmitted information. The present invention may be used at least in part for quantum communications, quantum cryptography, encoding of classical or quantum information, and in conjunction with various transmission media including free space communications.

In other embodiments of the invention various higher-order Gaussian beams can be used as well as Laguerre-Gaussian (LG) modes, higher order modes, and/or orbital angular momentum.

In yet another embodiment the present invention may also employ various optical elements which include but are not limited to diffractive optical elements (DOEs) and which may further include microfabricated diffractive DOEs with fixed phase transfer properties.

Further embodiments may include multiple transmitters and/or detectors, adaptive optics for such purposes as correction of degradation in transmission medium (e.g. fiber, air, etc) and may adjust for angular misalignment or lateral misalignment (e.g. of transmitter and/or receiver or detector).

While several embodiments have been shown and described herein, it should be understood that changes and modifications can be made to the invention without departing from the invention in its broader aspects. Various features of the invention are defined in the following Claims:

The invention claimed is:

1. A method of generating a topologically multiplexed light beam for use in optical data communications, comprising the steps of:
    providing at least one information-carrying light beam illuminating a first optical element;
    using the first optical element to deflect the at least one information-carrying light beam into at least one selected direction;
    providing the at least one information-carrying light beam with a plurality of specific topological charges imposed on the light beam, thereby providing a resultant multiplexed light beam suitable for use in optical data communications via different topological channels; and
    using a second optical element to divide the at least one resultant beam into a plurality of constituent beams, wherein the first and second optical elements comprise at least two optical elements, with the second optical element being oriented backwards relative to the first optical element on an optical axis.

2. The method as defined in claim 1 wherein the multiplexed light beam includes a superposition of different helical modes.

3. The method of claim 1 wherein deflection of the information-carrying light beam comprises adding a phase function $\phi_k(\vec{\rho}) = \vec{k} \cdot \vec{\rho}$, to the light beam.

4. The method of claim 1 further including the step of processing at least one of the information-carrying beam and the resultant light beam by at least one of wavelength modulation, amplitude modulation, phase modulation, and time pulse modulation.

5. The method of claim 1 further including the step of generating a plurality of data channels from the resultant light beam.

6. A method of providing topological data communication, comprising the steps of:
    a source of light for providing a beam of light for carrying information wherein the first diffractive optical element introduces a superposition of the plurality of topological charges;
    using a first diffractive optical element to provide a multiplexed light beam having an imposed plurality of topological charges wherein data from the multiplexed light beam is encoded in the sequence of topological charges, creating a plurality of topological data channels for use in data communication;
    providing a second diffractive optical element to change the multiplexed light beam into a de-multiplexed light beam; and
    reading out the multiplexed light beam using a detector to provide information for data communication.

7. The method of claim 6 wherein the sequence of topological charges is time dependent and the time-dependent sequence of topological charges modulates between at least a first state and a second state.

8. The method of claim 6 further comprising the step of moving among the plurality of topological data channels using the time dependent detector.

9. The method of claim 6 further including the step selected from the group consisting of at least one of processing the beam of light, processing the multiplexed light beam, performing a wavelength modulation, performing an amplitude modulation, performing a phase modulation and performing a time pulse modulation each for use in data communication.

10. The method of claim 6 wherein data from the multiplexed light beam is encoded in multiple simultaneous topological channels using a superposition of helical states.

11. The method of claim 6 wherein the detector operates in at least one of a time dependent manner and in a manner to detect an individual topological channel of a plurality of topological channels disposed in parallel.

12. The method of claim 6 wherein the detector comprises a diffractive optical element.

13. The method of claim 6 wherein the detector comprises a spatially resolved parallel topological detector.

14. The method of claim 6 further including the step of processing at least one of the information-carrying beam of light and the multiplexed light beam by at least one of wavelength modulation, amplitude modulation, phase modulation, and time pulse modulation.

15. The method of claim 6 further including the step of generating a plurality of data channels from the resultant light beam.

16. A system for processing a topologically multiplexed light beam for use in optical data communications, comprising at least one of the components,
a first diffractive optical element for acting on an input light beam having a phase, the first diffractive optical element constructed to provide a selected plurality of topological charges to create an output light beam of at least one multiplexed resultant light beam carrying a superposition of different helical modes on the multiplexed resultant light beam to enable data communication; and
a second diffractive optical element for deflecting the multiplexed resultant light beam away from an undiffracted portion of the input light beam and a detector for sensing the diffracted multiplexed light communication beam, thereby enabling use of the multiplexed light beam for optical data communications.

17. The system of claim 16 wherein the first diffractive optical element processes the resultant light beam by at least one of wavelength modulation, amplitude modulation, phase modulation, and time pulse modulation.

18. The system of claim 16 further including a component for generating a plurality of data channels from the resultant light beam.

19. A method of analyzing topological data communication, comprising the steps of:
using a first diffractive optical element to operate on a beam of light already carrying modulated information selected from the group of amplitude, wavelength and phase, and including a multiplexed light beam; and
operating on the multiplexed light beam having an imposed plurality of topological charges to read out the multiplexed light beam using a detector to provide data communication information wherein the detector operates in at least one of a time dependent manner and in a manner to detect an individual topological channel of a plurality of topological channels disposed in parallel.

20. The method of claim 19 further comprising the step of moving among the multiplexal light beam having the plurality of topological charges using the time dependent detector.

21. The method of claim 19 further including the step selected from the group consisting of at least one of processing the beam of light, processing the multiplexed light beam, performing a wavelength modulation, performing an amplitude modulation, performing a phase modulation and performing a time pulse modulation each for use in processing the data communication information.

22. The method of claim 19 wherein data from the multiplexed light beam is encoded in multiple simultaneous topological channels using a superposition of helical states present in the first diffractive optical element.

23. The method of claim 19 wherein the detector comprises a diffractive optical element.

24. The method of claim 19 wherein the detector comprises a spatially resolved parallel topological detector.

25. The method of claim 19 further including the step of generating a plurality of data channels from the multiplexed light beam having been read out.

26. A method of providing topological data communication, comprising the steps of:
providing a beam of light for carrying information;
providing a multiplexed light beam having an imposed plurality of topological charges; and
reading out the multiplexed light beam using a detector to provide information for data communication, operation of the detector being in at least one of a time dependent manner and in a manner to detect an individual topological channel of a plurality of topological channels disposed in parallel.

* * * * *